(12) United States Patent
Talwar et al.

(10) Patent No.: US 11,405,315 B2
(45) Date of Patent: Aug. 2, 2022

(54) MULTI-HOP PHYSICAL LAYER DATA COLLECTION PROTOCOL

(71) Applicant: Juniper Networks, Inc., Sunnyvale, CA (US)

(72) Inventors: Manish Talwar, Lunenburg, MA (US); Ajay Kachrani, Nashua, NH (US); Gert Grammel, Ditzingen (DE); Hao Wang, Kanata (CA); Tanweer Biswas, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 74 days.

(21) Appl. No.: 17/032,450

(22) Filed: Sep. 25, 2020

(65) Prior Publication Data

US 2022/0103473 A1    Mar. 31, 2022

(51) Int. Cl.
*H04L 45/74* (2022.01)
*H04L 45/02* (2022.01)
*H04L 69/164* (2022.01)
*H04L 9/40* (2022.01)
*H04L 69/22* (2022.01)

(52) U.S. Cl.
CPC ............ *H04L 45/74* (2013.01); *H04L 45/02* (2013.01); *H04L 63/0485* (2013.01); *H04L 69/164* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2005/0053006 A1 | 3/2005 | Hongal et al. | |
| 2015/0200827 A1* | 7/2015 | Agarwal | H04L 65/4076 714/37 |
| 2016/0142291 A1 | 5/2016 | Polland | |
| 2019/0268257 A1* | 8/2019 | Zhang | H04L 43/50 |
| 2020/0196219 A1* | 6/2020 | Hashemi | H04W 40/20 |

OTHER PUBLICATIONS

"European Application Serial No. 20214314.5, Extended European Search Report dated Jun. 8, 2021", 12 pgs.

* cited by examiner

*Primary Examiner* — Robert M Morlan
(74) *Attorney, Agent, or Firm* — Schwegman Lundberg & Woessner, P.A.

(57) ABSTRACT

Disclosed embodiments utilize a layer three and/or layer four protocol to collect physical layer properties along a multi-hop network path between a source node and a destination node. The use of a layer three or layer four protocol provides an ability to span multiple links or networks between the source node and destination node, while also collecting the physical layer properties. Once physical layer properties along a network path can be understood, decisions relating to the configuration of the network path and/or whether to communicate via the network path are improved.

20 Claims, 9 Drawing Sheets

MULTI-HOP PHYSICAL LAYER DATA COLLECTION PROTOCOL

BACKGROUND

Encryption and Synchronization functions are typically implemented at a physical network layer. However, this solution relies on an uninterrupted chain of secured links between two devices in network communication with each other. To ensure security of communication that relies on encryption and/or synchronization at the link level, it can be important to verify that such communication is in place before performing said communication.

DETAILED DESCRIPTION

Disclosed are embodiments for collecting physical layer link properties across a network path that includes a plurality of network devices. While the physical layer maintains information that is important for ensuring secure communication, the physical layer does not provide communication across multiple network links. Therefore, it can be difficult to ascertain the configuration and/or property settings of a physical network layer of a network device, especially if that network device is multiple hops away from a device attempting to ascertain the device's status. Thus, a technical problem results in that it can be difficult to ensure that each physical link of a multi-hop network path is configured properly, thus preventing endpoint devices from effectively relying on physical link features that might otherwise be beneficial.

The disclosed embodiments provide a technical solution to this technical problem by combining the use of a level three and/or level four protocol to provide for traversal of a multi-hop network path between two endpoint devices in communication with each other. This level three and/or level four protocol is combined with a request/response message exchange that facilitates collection of physical layers (e.g. level one and/or level two of the open systems interconnection (OSI) model) parameter or property values. As the request travels along the multi-hop network path, one or more devices included in the path add their local property values as requested to the request itself. When the request reaches the destination endpoint, the destination endpoint generates a response message that includes all of the collected physical layer property values from the other devices.

Figure 1:
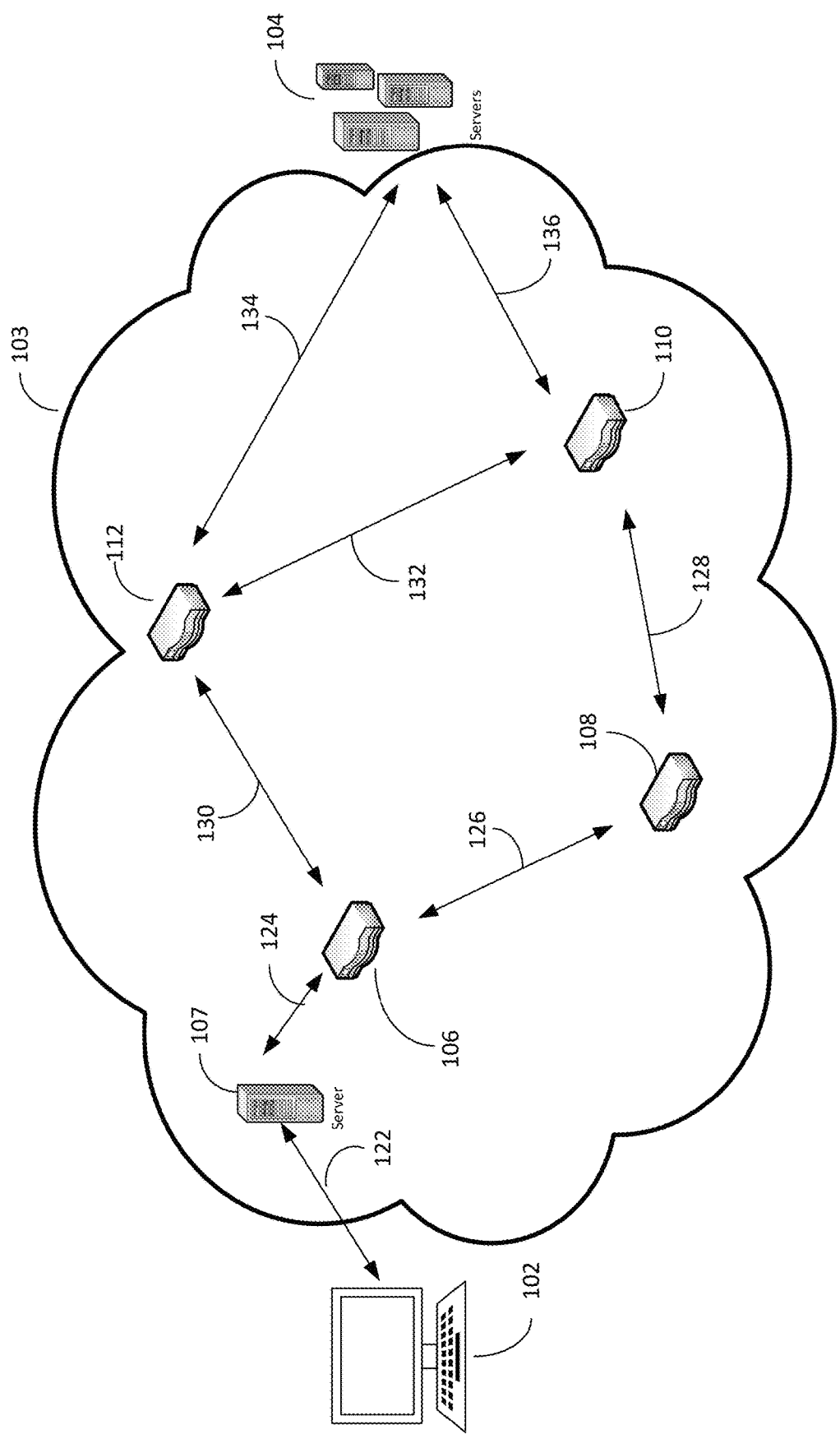
FIG. 1 is an overview diagram of a network implementing one or more of the disclosed embodiments.

FIG. 1 is an overview diagram of a network implementing one or more of the disclosed embodiments. FIG. 1 shows a source device 102. The source device is connected, via a network 103, to a destination device 104.

Communication between the source device 102 and the destination device 104 is accomplished via a plurality of devices included within the network 103. These devices include a server 107, a router 108, a router 110, and a router 112. The plurality of devices within the network 103 provide at least two distinct network paths between the source device 102 and the destination device 104. For example, network traffic can travel via a first path from the server 107, to the router 106, to the router 112, to the destination device 104. Alternatively, network traffic can travel via a second path from the server 107, to the router 106, to the router 108, to the router 110, and then to the destination device 104. A third path from the source device 102 to the destination device 104 includes the server 107, router 106, router 108, router 110, router 112, and then to destination device 104. A fourth path from the source device 102 to the destination device 104 includes the server 107, router 106, router 112, router 110, and then to the destination device 104.

The disclosed embodiments recognize that it can be useful to understand conditions at a link or physical layer at each device within a network path between two devices, such as the source device 102 and destination device 104. Thus, for example, with respect to the first path discussed above, it can be useful to understand one or more level one (1) or level two (2) parameters of links 122, 124, 130, and 134, which connect devices comprising the first path, discussed above. Similarly, if network traffic between the source device 102 and the destination device 104 is traversing the second path, it can be useful to understand link states for the links 122, 126, 128, 132 and 136. Thus, the disclosed embodiments make use of a level three and/or level four protocol to traverse a network path between the source device 102 and the destination device 104. A request for level one (1) and/or level two (2) parameters is initiated by the source device 102, and traverses the network path, via the level three or level four protocol, to the destination device. As the request is received and processed by one or more devices included in the network path, those network devices add information relating to local values of the requested level one and/or level two parameters to the request message. The request is then forwarded along the network path toward the destination. Upon reaching the destination, the destination device 104 also, in at least some embodiments, adds its local level one and/or level two parameters to the portion of the request. A response message is then generated by the destination device 104, with the response message including the portion of the request that indicates values of the requested properties as collected along the network path. This response message is then delivered, via the same level three and/or level four protocol used to delivery the request to the destination, to the original source device. Using level three and/or level four protocols to collect level one (1) and/or level two (2) properties along the network path enables a more comprehensive data collection of level one (1) and/or level two (2) properties than is possible using level one (1) and/or level two (2) protocols alone, as these protocols are not typically able to traverse multiple different level one (1) and/or level two (2) links. The level one and/or level two property values that can be requested by the disclosed embodiments include, but are not limited to a property indicating whether media access control (MAC) security (MACSec) is enabled, a property indicating whether synchronous Ethernet (SyncE) is enabled, a property indicating whether precision time protocol (PTP) is enabled, a property indicating whether optical transport network (OTN) security is enabled, a property indicating a maximum transmission data unit (MTU) size, a property indicating a synchronization state of the network device, or a property indicating a level one or level two attribute of the network device.

Figure 2:
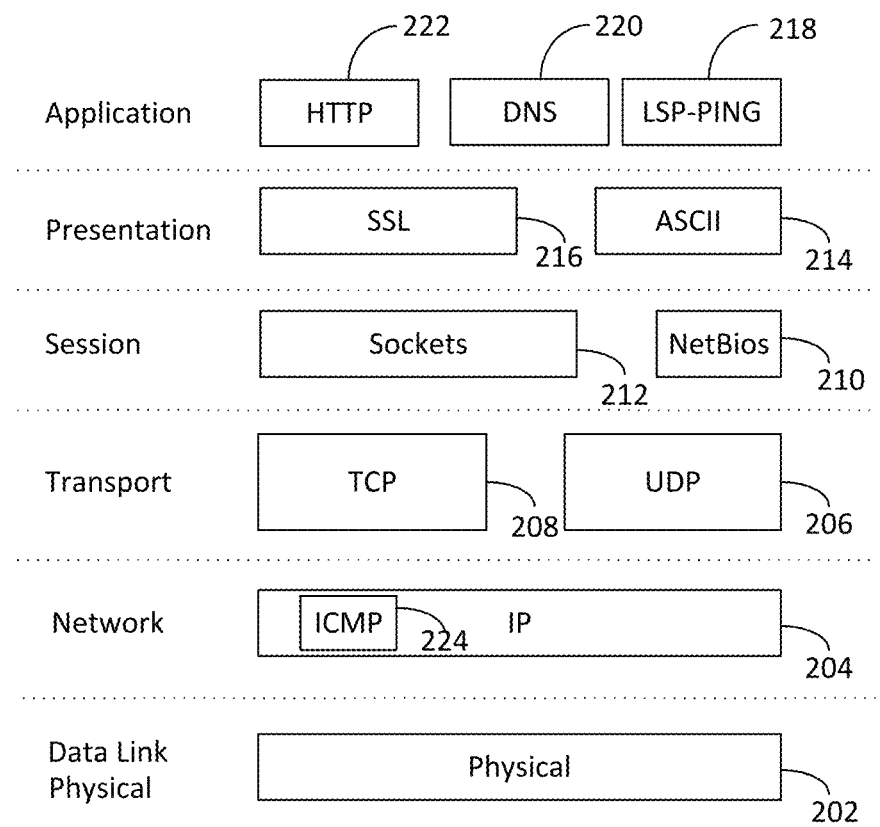
FIG. 2 is an example network protocol stack, with each layer of the network protocol stack identified with respect to the ISO network model.

FIG. 2 is an example network protocol stack, with each layer of the network protocol stack identified with respect to the ISO network model. At the bottom of the stack is a physical layer 202, which corresponds to the physical and/or data link layer in the ISO model. The Internet Protocol (IP) 204 resides at a network layer of the ISO model. The network layer is considered "layer 3" in the ISO model. The network layer provides a means of transferring variable length data from one node to another connected via one or more networks. In this context, a network is a physical medium in which many nodes are connected. Each node within a network has a unique address that identifies the node within the network. Protocols included in the network layer include routing protocols, multicast group management, network-layer information and error, and network-layer address assignment.

The user datagram protocol (UDP) 206 and the transmission control protocol (TCP) 208 are two examples of a transport layer protocol. Transport layer protocols are considered layer four protocols within the ISO model. Some transport layer protocols, such as the TCP protocol 208, provide reliable and in-order end to end delivery of data. This is accomplished, in at least some embodiments, via explicit acknowledgment of each byte of data transferred via sequence numbers identifying each byte. The transport layer, in some embodiments, segments a data message into multiple portions and retransmits those segments for which no acknowledgment is received. Other transport layer protocols, such as the UDP protocol 206, do not ensure reliable delivery. The OSI model defines five classes of transport protocols, labeled TP0 . . . TP4. The classifications are based on whether various features are present, such as segmentation and reassembly, error recovery, retransmissions, flow control, etc.

FIG. 2 also illustrates that a netbios protocol 210 and/or a sockets protocol 212 are included in the ISO's session layer. The ISO presentation layer includes, for example, an ascii layer 214 or a secure sockets layer 216. The ISO application layer includes, for example, a hypertext transfer protocol (HTTP) 222, domain name service protocol 220, and a Label Switched Path (LSP)-ping protocol 218. FIG. 2 further illustrates that the IP protocol 204 includes a protocol known as the Internet control message protocol (ICMP). Some of the disclosed embodiments utilize a layer three protocol (e.g. the IP protocol 204, and specifically the ICMP protocol 224) to collect information, for links within a network path between a source device and a destination device, relating to layer one or layer two of the ISO model (e.g. information relating to the physical layer 202). Some of the disclosed embodiment utilize a layer four protocol (e.g. the TCP protocol 208 or the UDP protocol 206) to collect information, for links within a network path between a source device and a destination device, relating to layer one or layer two of the ISO model.

Figure 3:
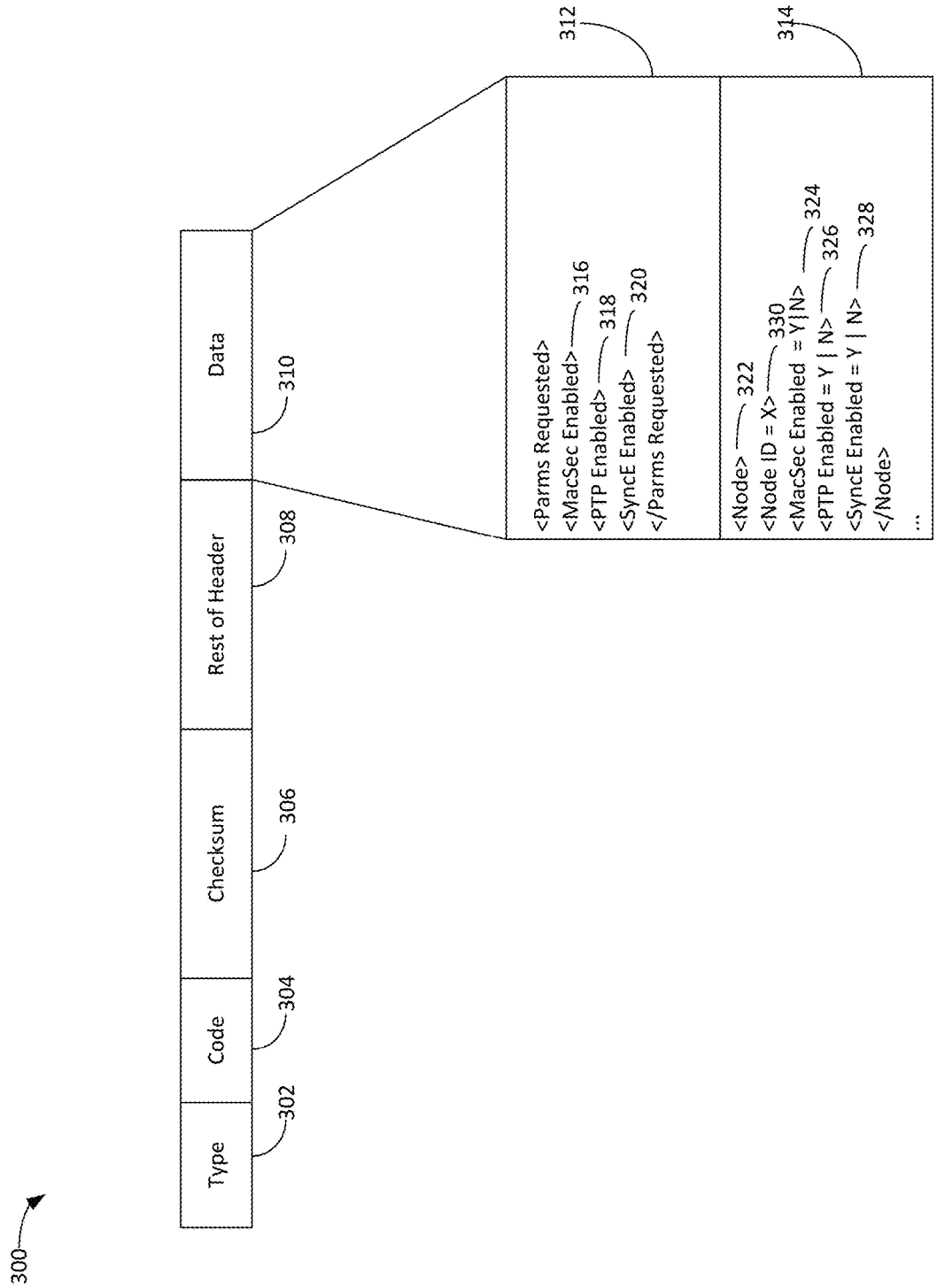
FIG. 3 is an example format of an ICMP message.

FIG. 3 is an example format of an ICMP message. The example ICMP message 300 includes a type field 302, code field 304, checksum field 306, and a type specific data field 308. Some embodiments define a particular value of the type field 302 to indicate that the ICMP message 300 is a request for level one (1) and/or level two (2) parameters at each node receiving the example ICMP message 300. Some embodiments define a particular value of the code field 304 to indicate that the ICMP message 300 is a request for level one (1) and/or level two (2) parameters at each node receiving the example ICMP message 300. Some embodiments define a second particular value of the code field 304 to indicate that the ICMP message 300 is a reply to a previous request for level one (1) and/or level two (2) parameters at each node.

For example, some embodiments define that an extended Echo Request (Type value of 42) indicates a request for level one (1) and/or level two (2) parameters. A reply to the extended echo request is indicated, in at least some of these embodiments, via a type value of 43. Other embodiments define alternative values for the request and reply for level one (1) and/or level two (2) parameters. For example, at a time of this writing, values between 44 and 252 remain unassigned. Thus, some embodiments select from the unassigned identifiers to identify the request/reply messages that are a subject of this disclosure.

Some embodiments make use of ICMP extension object classes and class sub-types to identify a request for or reply with level one (1) and/or level two (2) parameter values. For example, some embodiments encode the request and/or reply in an interface information object. (Class 2).

Some embodiments store indications of requested level one (1) or level two (2) parameters of a node in the type specific data field 308. Some example level one (1) or level two (2) parameters requested by the example ICMP message 300 include properties indicating whether media access control (MAC) security is enabled (MACSec), whether precision time protocol (PTP) is enabled, whether optical transport network (OTN) security is enabled, whether synchronous Ethernet (SyncE) is enabled, or a property indicating a maximum transmission data unit (MTU) size.

FIG. 3 illustrates an example format of the ICMP data field 310. The ICMP data field 310 is shown to include two portions. A first request portion 312 defines which level one or level two parameters are requested by the example ICMP message 300. The example first request portion 312 shows the use of XML to provide a list of parameters requested. In the illustrated embodiment, the example message requests a first property 316 indicates whether MACSec is enabled, a second property 318 indicating whether PTP is enabled, and a third property 320 indicating whether synchronous Ethernet is enabled.

A second portion 314 defines data associated with a particular node along a network path between a source device that originally generated the example ICMP message 300 and a destination device identified by a destination IP address of an IP protocol header that encapsulates the ICMP message 300. Each node along the path adds a node entry 322 to the second portion 314. The node entry 322 defines properties requested by the first request portion 312. For example, the example node entry 322 illustrates values for the MACSec enabled property 324, PTP enabled property 326, and SyncE property 328. The node entry 322 also identifies the node providing the requested property values. The node is identified, in at least some embodiments, by an IP address of the node. Some embodiments may identify the node using a station address or other unique identification. Note that as the example ICMP message 300 travels along a network path between a source device (e.g. source device 102) to a destination device (e.g. destination device 104), each node within the network path, or at least some nodes within the network path, append an additional second portion 314, identifying the respective node via XML element 330, and including parameter values specific to the respective node.

In some example embodiments, a device within the network path between the source node and the destination node adds a node entry 322 to the ICMP message, with the added or appended node entry indicating the requested one or more property values. Thus, a collection of added or appended node entries represent a collective response, along a network path, to a request, with the collective response aggregating property values from one or more network devices along the network path. Thus, for example, if three property values are requested by the request, and there are five (5) network devices along a network path between a source device and a destination device, a response message to the request includes up to fifteen property entries, with each property entry defining a separate property value from one of the five devices. This is just an example, but in general, the request aggregates property values as it moves along the network path from the source device to the destination, and the response message includes this aggregation of property values, and provides those values back to the source device.

Figure 4:
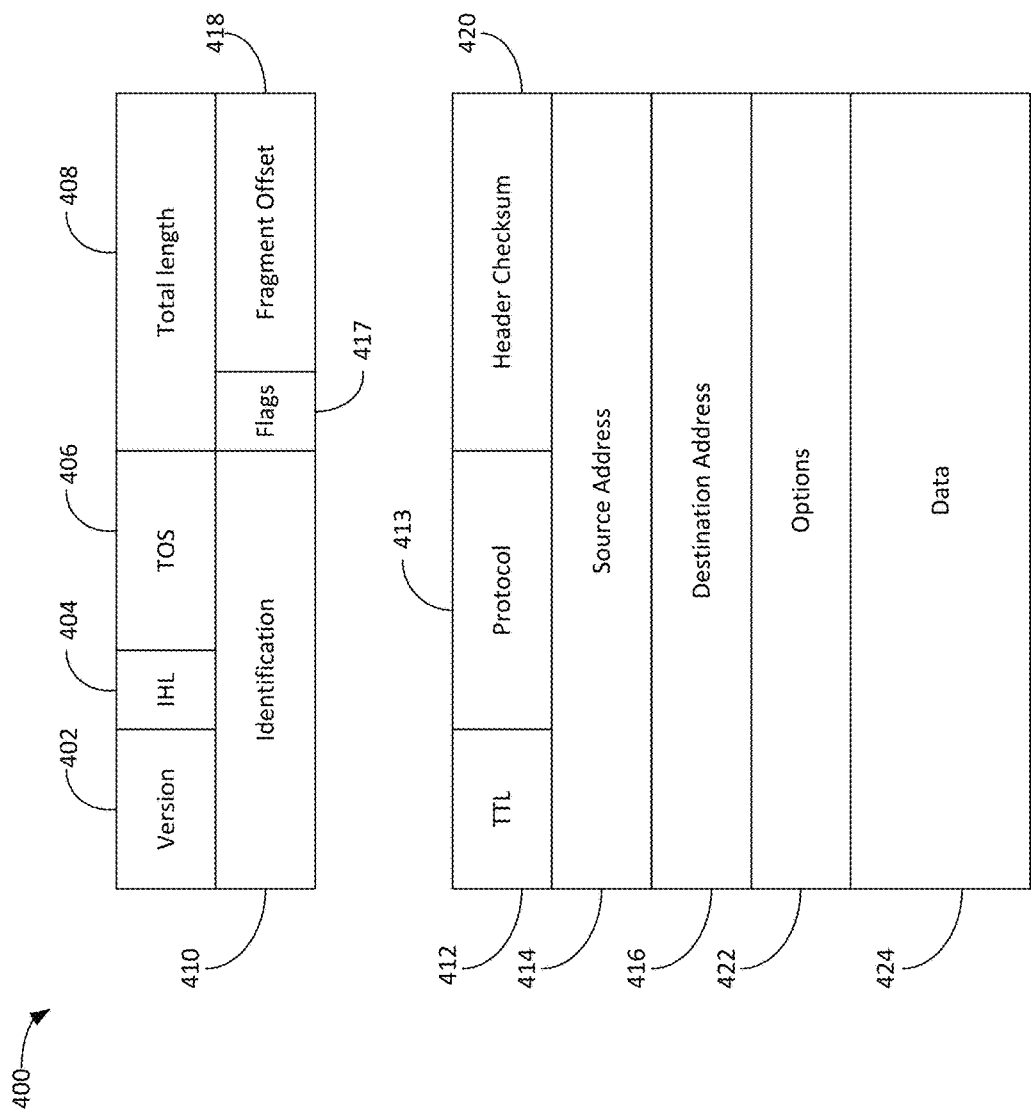
FIG. 4 shows an example level three protocol header.

FIG. 4 shows an example level three protocol header. The example of FIG. 4 shows an Internet Protocol (IP) header. The IP header 400 includes a version field 402, an internet header length (IHL) field 404, a type of service (TOS) field 406, a total length field 408, an identification field 410, a flags field 417, a fragment offset field 418, a time to live (TTL) field 412, a protocol field 412, a header checksum field 420, a source address field 414, and destination address field 416, an options field 422, and a data field 424. Note that the example IP header 400 of FIG. 4 is an IP v4 header. Some embodiments utilize an IP version 6 header (not shown).

Figure 5:
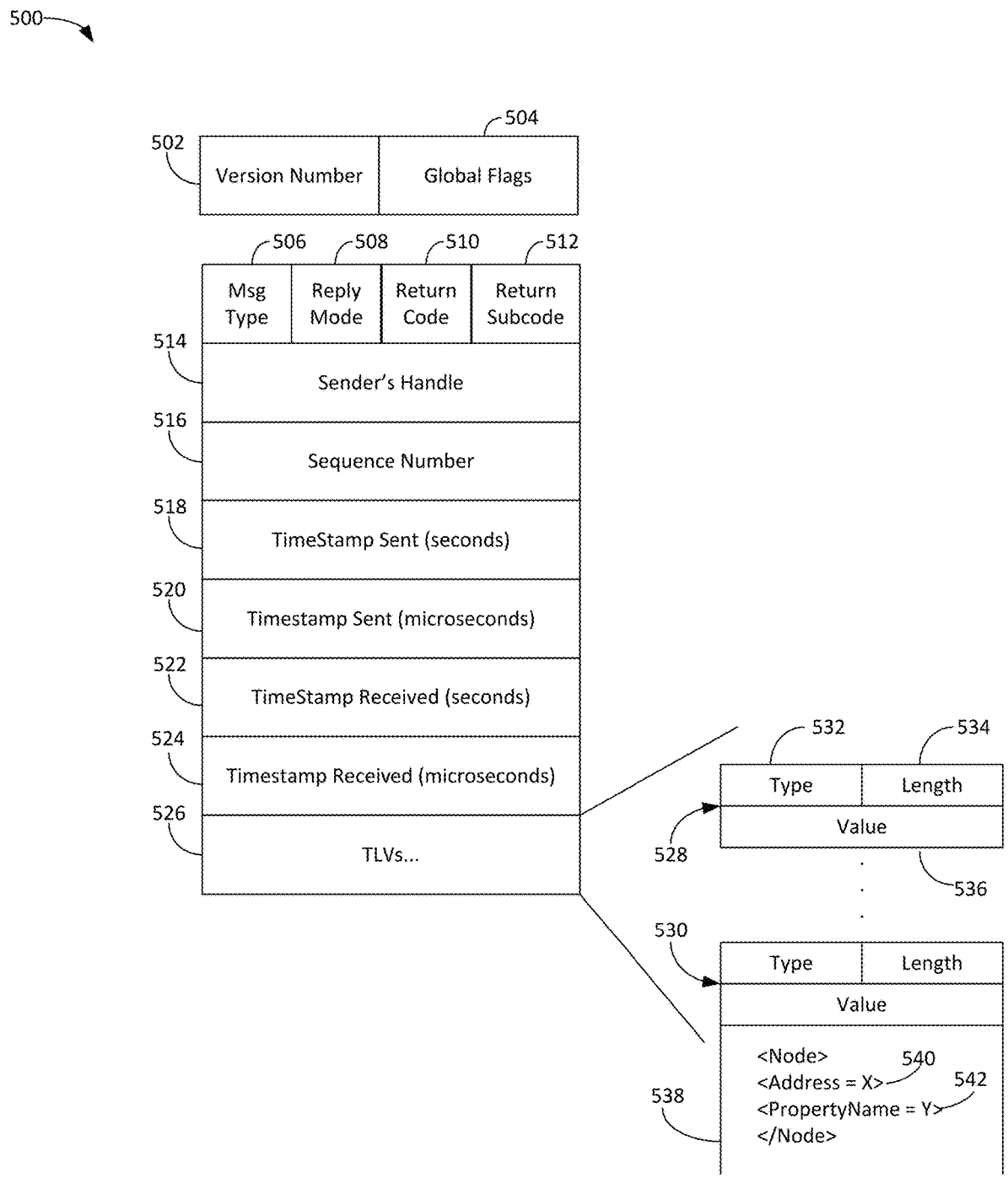
FIG. 5 is an example LSP-ping packet.

FIG. 5 is an example LSP-ping message 500. The example LSP-ping message 500 is encapsulated, by at least some of the disclosed embodiments, in a TCP or UDP protocol header. The example LSP-ping message 500 includes a version number field 502, a global flags field 504, a message type field 506, a reply mode field 508, a return code field 510, a return subcode field 512, a sender's handle field 514, a sequence number field 516, a timestamp sent in seconds field 518, a timestamp sent in microseconds field 520, a timestamp received in seconds field 522, a timestamp received in microseconds field 524, and a type length values (TLVs) field 526.

The TLVs field 526 includes zero or more TLVs, two examples of which are shown as TLVs 528 and 530. Each TLV includes a type field 532, a length field 534, and a value field 536.

Consistent with at least RFC 4379, LSP-ping and traceroute utilize the reply mode field 508 to signal use of the LSP-ping message 500 for a Multiprotocol Label Switching (MPLS) echo request. In at least some embodiments, a predefined value of one (1) has been allocated to indicate same. The LSP-ping message 500 can also be used to indicate a MPLS echo reply, using a predefined value of two (2).

Some of the disclosed embodiments define new values for the reply mode field 508. For example, a new first predefined value indicates, in some embodiments, an enhanced MPLS echo request, and a second predefined value indicates, in some embodiments, an enhanced MPLS echo reply. The enhanced MPLS echo request and reply provide an ability to collect level one and/or level two property values from link layers of devices within a network path between a source device and a destination device, as the MPLS echo request propagates along the network path (e.g. via the IP protocol). The enhanced MPLS echo request and enhanced MPLS echo reply define additional TLVs that accomplish the collection of level one and/or level two property values.

Some of the disclosed embodiments define a first predefined type field value of the type field 532 that defines a request for a level one (1) or level two (2) property value. For example, using the above examples of level one or level two properties, the first predefined type field value requests a property indicating whether MACSec is enabled, a second predefined type field value requesting a property indicating whether PTP is enabled, or a third predefined type field value requesting a property indicating whether synchronous Ethernet (SyncE) is enabled. In some other embodiments, a type field 532 value indicates a request for level one or level two (2) properties, which the specific properties being requested indicated in the value field 536. Some of the disclosed embodiments decode TLVs included in a LSP-ping packet, such as the example LSP-ping message 500 to identify requests for level one or level two property values.

In some embodiments, a device within the network path between the source node and the destination node adds a TLV to the LSP-ping packet, with the added or appended TLV indicating the requested value. Thus, a collection of added or appended TLV entries represent a collective response, along a network path, to a request, with the collective response aggregating responses from one or more network devices along the network path. Thus, for example, if three property values are requested by the request, and there are five (5) network devices along a network path between a source device and a destination device, a response message to the request includes up to fifteen TLV entries, with each TLV entry defining a separate property value from one of the five devices. This is just an example, but in general, the request aggregates property values as it moves along the network path from the source device to the destination, and the response message includes this aggregation of property values, and provides those values back to the source device.

For example, continuing the example above, some embodiments define a fourth type field value indicating a property value is defined by the TLV, with the property value indicating whether MACSec is enabled at the node adding the property value. The value field 536 of the respective TLV then defines at least the supplied property value and an identification of the node providing the property value (e.g. via an IP address, station address, or other unique identifier of the node). An example value field format is shown as value field 538. The example value field 538 utilizes XML format to defines an identification 540 of a node providing the property value, shown as "X", and a value 542 of the property (shown as "Y"). The example value field 538 is just an example and other methods of defining property values and node identifications are not outside the scope of the disclosed embodiments.

Figure 6:
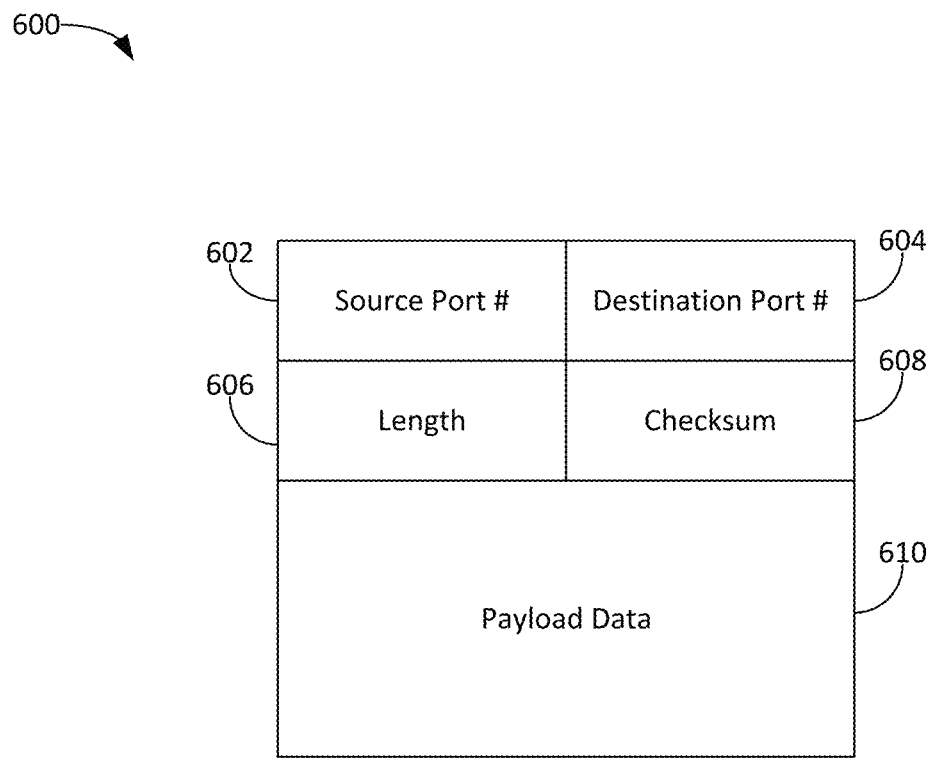
FIG. 6 shows an example level four protocol header.

FIG. 6 shows an example format of a level four protocol header. The UDP header 600 of FIG. 6 is a user datagram protocol (UDP) header. The UDP header 600 includes a source port field 602, destination port field 604, length field 606, checksum field 608, and a variable length payload data field 610. In some embodiments, a packet having a UDP header such as the UDP header 600 will indicate such in an IP protocol header, such as the IP header 400 discussed above with respect to FIG. 4. In some embodiments, the protocol field 413 indicates a UDP protocol header is included in the packet (e.g. a predefined value of seventeen (17) indicates a UDP header is present in an IP packet, while a predefined value of six (6) indicates a TCP header is present in an IP packet). In some embodiments, the data field 610 stores data substantially in conformance with the LSP-ping message 500 discussed above with respect to FIG. 5.

Figure 7:
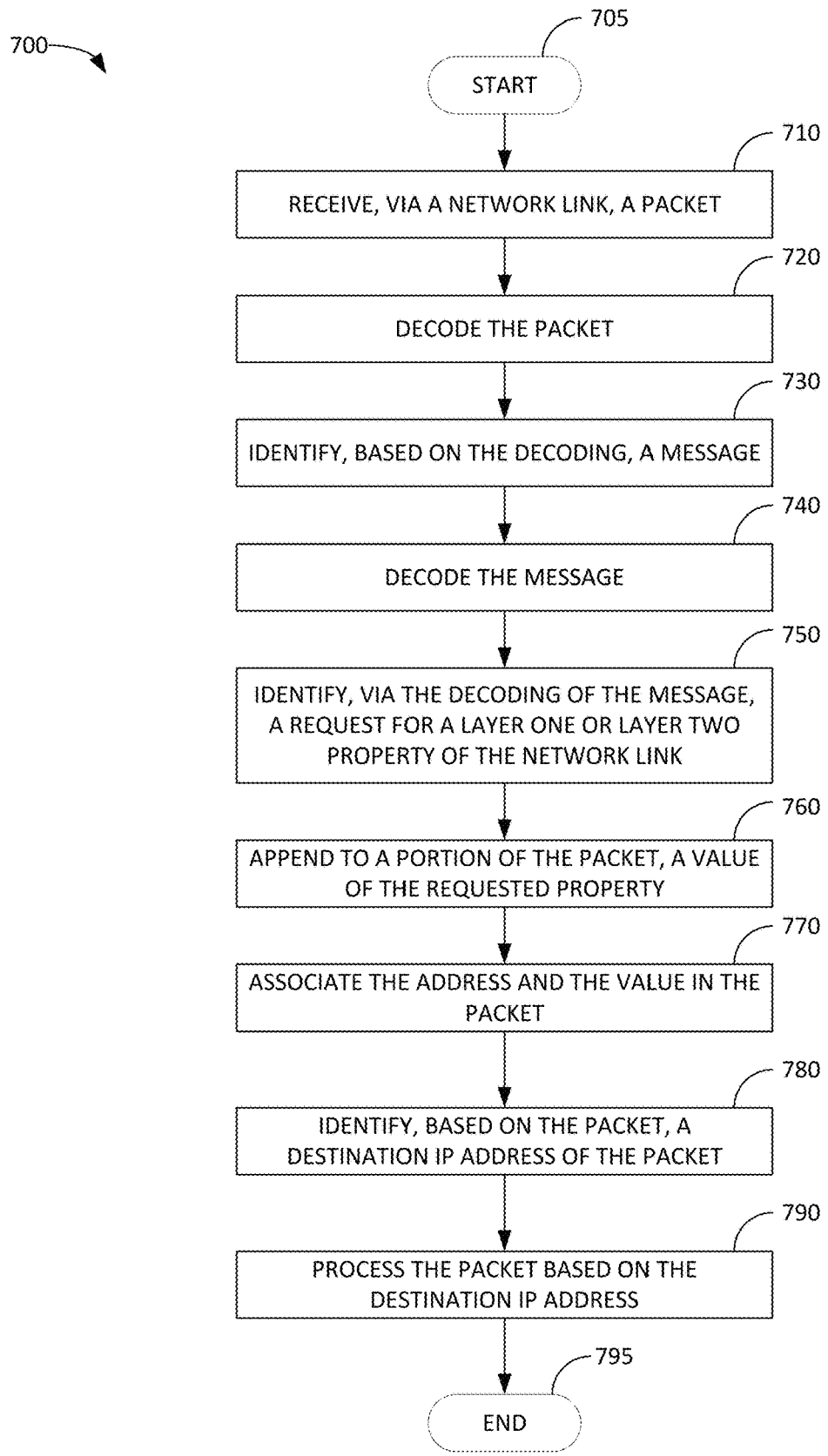
FIG. 7 is a flowchart of an example method performed by one or more of the disclosed embodiments.

FIG. 7 is a flowchart of an example method performed by one or more of the disclosed embodiments. In some embodiments, one or more of the operations discussed below with respect to FIG. 7 are performed by hardware processing circuitry. For example, in some embodiments a hardware processor (e.g. hardware processor 902 discussed below) is configured by instructions (e.g. instructions 924 discussed below) stored in a memory (e.g. memory 904 and/or 906) to perform one or more of the operations discussed below with respect to FIG. 7 and the method 700.

After start operation 705, the method 700 moves to operation 710. In operation 710, a first packet is received via a network link. For example, each of the network devices of FIG. 1, such as the server 107, router 106, router 108, router 110, and destination device 104 receive a packet via links 122, 124, 126, 128, or 136 respectively.

In operation 720, the packet is decoded. In some embodiments, a layer three or layer four protocol header of the received first packet is decoded. Decoding the first packet can include parsing fields in the first packet so as to interpret a meaning of the first packet. For example, operation 720 includes, in some embodiments, identifying the first packet as an ICMP message (e.g. by parsing an IP protocol header included in the first packet). In some embodiments, operation 720 includes decoding either a TCP header or a UDP header. For example, the first packet includes, in some embodiments, an IP header that specifies the first packet includes either a TCP header or a UDP header. Operation 720 then provides the first packet to a code module or other instructions to further parse and decode the identified header.

In operation 730, a message is identified based on the decoding. For example, in embodiments that identify an ICMP message, the ICMP message is identified (e.g. a message having a format at least similar to the example ICMP message 300 discussed above with respect to FIG. 3. In embodiments that decode a layer four protocol header, operation 730 detects an LSP-ping message, such as the example LSP-ping message 500 discussed above with respect to FIG. 5. In some embodiments, a service access point field in the level four header indicates a destination port for the first packet, with the destination port being managed by an LSP-ping application. Thus, the LSP-ping application receives the first packet, in these embodiments, from, for example, a UDP protocol or TCP protocol.

Operation 740 decodes the message identified in operation 730. For example, in embodiments receiving an ICMP message, the ICMP message is decoded. For example, an ICMP header, similar to the example ICMP header discussed above with respect to FIG. 3, is decoded to identify a value in the type field 302 and/or the code field 304. In embodiments receiving an LSP-ping message, one or more fields of the example LSP-ping message 500 are decoded to determine their values. For example, in some embodiments, the reply mode field 508 is decoded to determine it indicates the message is an enhanced MPLS echo request.

Operation 750 decodes the message to identify a request for a layer one or layer two property of the network link (e.g. the link over which the first packet was received). As discussed above, some embodiments encode the request in an ICMP message while other embodiments encode the request in a LSP-ping message. Other embodiments encode the request in a different layer three or layer four protocol.

Operation 760 appends information to the first packet. The information indicates a value of the requested L1 or L2 property. For example, as discussed above, in embodiments that utilize an ICMP message for the request, the value of the requested L1 or L2 property is encoded, in at least some of these embodiments, in the ICMP data field 310 of the ICMP message. For example, FIG. 3 shows an example of encoding one or more requested property values in an ICMP message. Some embodiments of method 700 encode one or more requested property values consistent with that example. Other embodiments code the one or more requested property values in a manner different than the example of FIG. 3. Other embodiments, such as those receiving an LSP-ping message, encode the requested property consistent with the example encoding illustrated in FIG. 5 and discussed in the corresponding description.

Operation 770 associates an address of the executing device with the property value included in the first packet by operation 760. In some embodiments, the address of the executing device is an Internet Protocol (IP) address (either a v4 or v6 address). For example, as discussed above with respect to FIG. 3, some embodiments that utilize ICMP messages associate an identification of a device with the device's requested property value via the XML element 330. Other embodiments associate a device identification with the device's requested property value via an XML element including the identification 540 and value 542. Other embodiments associate the device identification with the property value in another manner not illustrated by either FIG. 3 or FIG. 5.

Operation 780 identifies, based on the first packet, a destination address of the first packet. In some embodiments, the destination address is an IP address. In some other embodiments, the destination address is a station address. For example, some embodiments parse an IP header of the first packet to identify a destination IP address specified in a destination address field of the IP header.

In operation 790, the first packet is processed based on the destination address. In some embodiments, if the destination address identifies the executing device, then that indicates the device performing the method 700 is the destination address for the request for level one (1) or level two (2) property values. In some embodiments, if the destination address is equivalent to an IP address of the executing device, then the device executing the method 700 is the destination device.

Thus, in this case, operation 790 generates a new second packet that swaps the IP addresses of the first packet (source IP becomes destination IP of second packet, destination IP of first packet becomes source IP of second packet). The portion of the first packet including the L1 or L2 properties is also copied from the first packet to the second packet. Then the second packet is transmitted to the IP address specified in its destination IP header field. Note that in a case where the executing device is the destination device for the first packet, the executing device's level one and/or level two property values are not necessarily added to the first packet as described above, but are instead simply added to the second packet, which is then transmitted to device identified by a source address field of the first packet.

In some embodiments, the destination address of the first packet does not identify the executing device. In these circumstances, operation 790 forwards the first packet, including the appending information to a destination specified in the first packet. After operation 790 completes, the method 700 moves to end operation 795.

Figure 8:
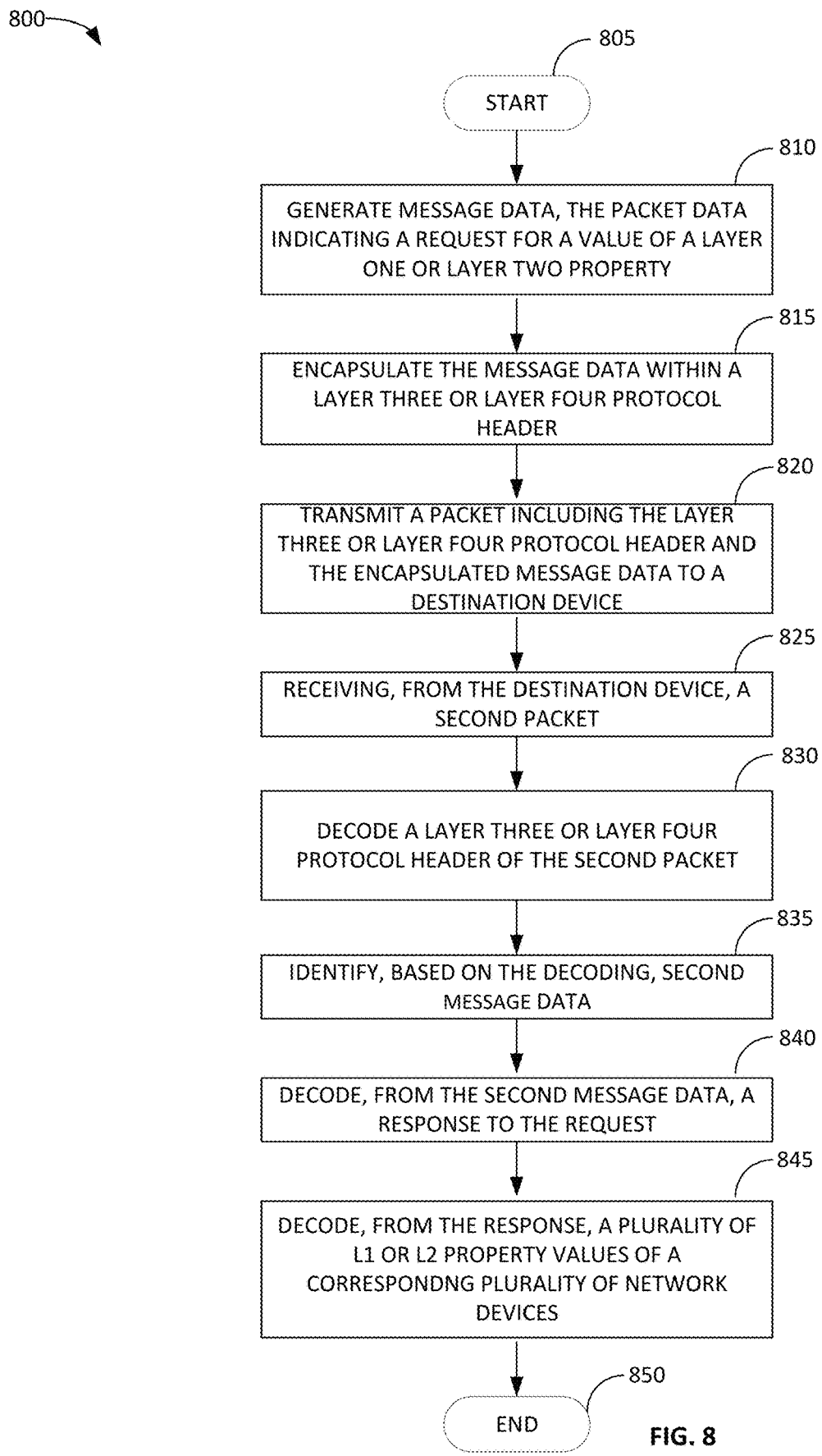
FIG. 8 is a flowchart of an example method performed by one or more of the disclosed embodiments.

FIG. 8 is a flowchart of an example method performed by one or more of the disclosed example embodiments. In some embodiments, one or more of the operations discussed below with respect to FIG. 8 are performed by hardware processing circuitry. For example, in some embodiments a hardware processor (e.g. hardware processor 902 discussed below) is configured by instructions (e.g. instructions 924 discussed below) stored in a memory (e.g. memory 904 and/or 906) to perform one or more of the operations discussed below with respect to FIG. 8 and method 800. In some embodiments, method 800 is performed by the source device 102, discussed above with respect to FIG. 1.

After start operation 805, method 800 moves to operation 810, where message data is generated. The message data indicates a request for a value of a layer one or layer two property. As discussed above, for example with respect to FIG. 3, some embodiments generate an ICMP message. In some embodiments, the ICMP message is generated so as to indicate a request for a value of a layer one and/or layer two property. For example, as discussed above, some embodiments set the type field 302 and/or code field 304 to indicate the ICMP message is a request for a layer one and/or layer two property. As illustrated above with respect to FIG. 3, some embodiments generate the message data to include a data field, analogous to the ICMP data field 310, and include data that requests one or more properties, including level one and/or level two properties in some embodiments.

Some embodiments generate the message data as a LSP-ping message, such as the example LSP-ping message discussed above with respect to FIG. 5. In some embodiments, the reply mode field 508 is set to a predefined value that indicates the LSP-ping message includes a request for properties, including a level one and/or level two (2) property.

In operation 815, the message data is encapsulated within a layer three or layer four protocol header. For example, as discussed above, in embodiments that encode the request in an ICMP message, the ICMP message is encoded within a IP header (layer 3 header). In embodiments that utilize LSP-ping to encode the request, the LSP-ping message is encapsulated within a TCP or UDP header in some embodiments (e.g. a layer four header).

In operation 820, a packet is transmitted. The packet includes the layer three or layer four protocol header and the encapsulated message. The packet is transmitted to a destination device. For example, in some embodiments, an IP header (e.g. IP header 400) identifies the destination address via an address in a destination address field of the IP header (e.g. field 416).

Operation 825 receives a second packet from the destination device. For example, as illustrated above with respect to FIG. 1, the source device 102 receives a response message from the destination device 104.

A layer three or layer four protocol header is decoded from the received second packet (see operation 830). For example, some embodiments decode an ICMP message from the second packet, such as the example ICMP message 300, discussed above with respect to FIG. 3. Other embodiments decode a UDP protocol header, such as the example UDP header 600, discussed above with respect to FIG. 6.

Thereafter, in operation 835, second message data is identified based on the decoding of operation 830. For example, the second message data is decoded, in some embodiments, from the ICMP data field 310 of an ICMP message. Other embodiments decode the second message data from the TLVs field 526 of the example LSP-ping message 500.

In operation 840, a response to the request is decoded from the second message data. For example, in some embodiments, the response is formatted in a similar manner to the second portion 314 discussed above with respect to FIG. 3. In some other embodiments, the request is decoded from data formatted in a similar manner to that of the example response shown in field 538 of FIG. 5 (e.g. including an example XML entry including an identification 540 and value 542 for example).

One or more L1 or L2 property values of a corresponding one or more network devices are decoded from the response, as shown in operation 845. For example, in some embodiments, operation 845 parses or otherwise decodes the ICMP data field 310 to identify the L1 and/or L2 property values. In some embodiments that utilize LSP-ping to request L1 and/or L2 property values, operation 845 decodes TLVs include in the TLVs field 526. For example, in some embodiments, operation 845 operates in accordance with the description of field 538, discussed above with respect to FIG. 5.

Once the property values are decoded, some embodiments display the property values on a display screen or include the property values in a report. Some embodiments change a network configuration based on the determined property values. For example, in some embodiments, method 800 generates one or more configuration messages that function to change level one and/or level two properties of a network device within a network path, so as to improve performance and/or reliability. After operation 845 completes, method 800 moves to end operation 850.

Figure 9:
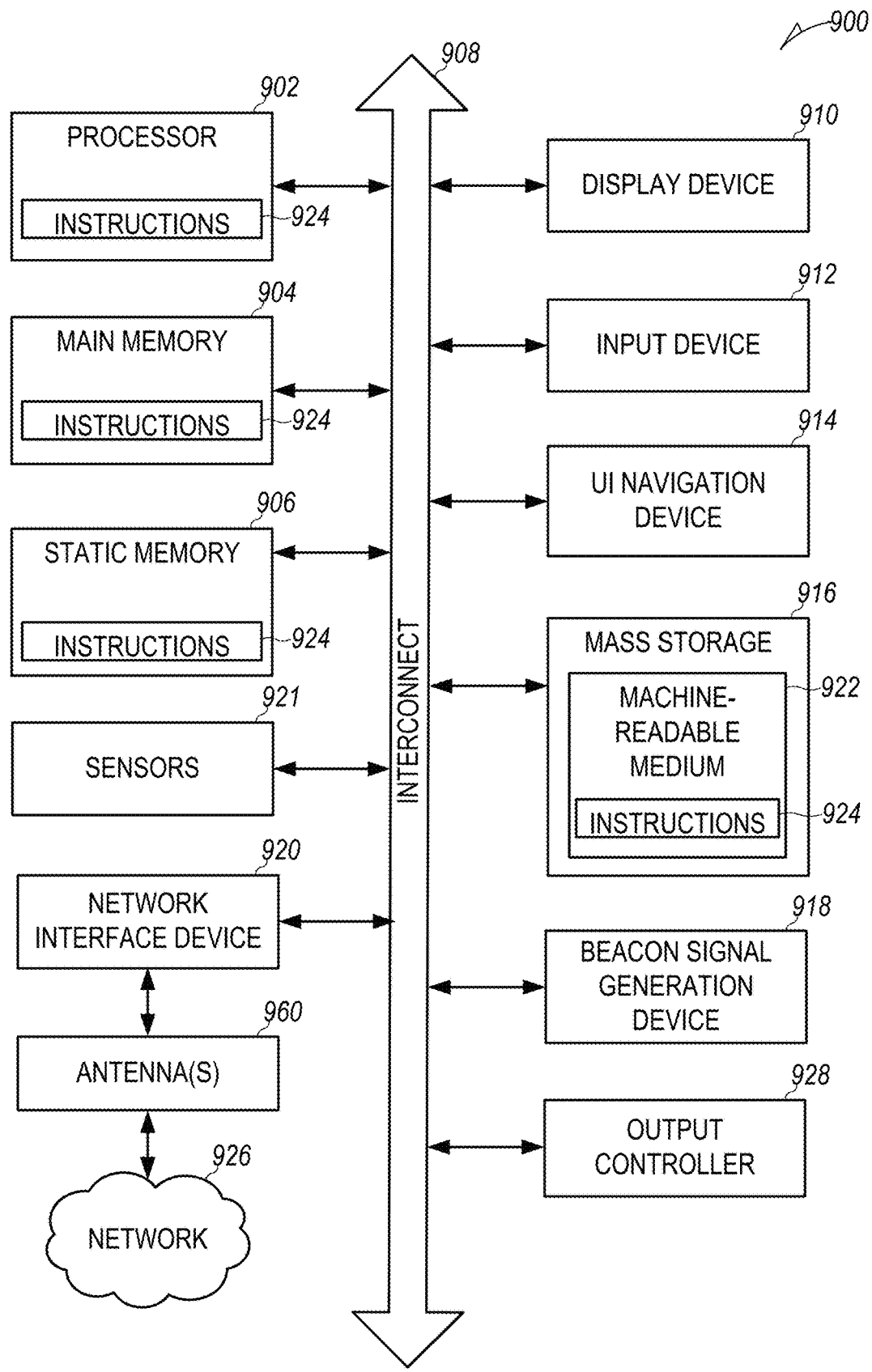
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. Machine 900 (e.g., computer system) may include a hardware processor 902 (e.g., a central processing unit (CPU), a graphics processing unit (GPU), a hardware processor core, or any combination thereof), a main memory 904 and a static memory 906, some or all of which may communicate with each other via an interlink 908 (e.g., bus).

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch screen display. The machine 900 may additionally include a mass storage device (e.g., drive unit) 916, a beacon signal generation device 918, a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 902 and/or instructions 924 may comprise processing circuitry and/or transceiver circuitry.

The mass storage device 916 may include a machine readable medium 922 on which is stored one or more sets of data structures or instructions 924 (e.g., software) embodying or utilized by any one or more of the techniques or functions described herein. The machine readable medium 922 is a non-transitory computer readable storage medium in at least some embodiments. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 916 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 922 is illustrated as a single medium, the term "machine readable medium" may include a single medium or multiple media (e.g., a centralized or distributed database, and/or associated caches and servers) configured to store the instructions 924.

An apparatus of the machine 900 may be one or more of a hardware processor 902 (e.g., a central processing unit (CPU), a graphics processing unit (GPU), a hardware processor core, or any combination thereof), one or more hardware memories, including one or more of a main memory 904 and a static memory 906. The apparatus of the machine 900 also includes, in some embodiments, one or more sensors 921, network interface device 920, one or more antennas 960, a display device 910, an input device 912, a UI navigation device 914, a mass storage device 916, instructions 924, a beacon signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a method performed by a network device, the method comprising: receiving, at the network device and via a network link, a packet; decoding the packet; identifying, based on the decoding, a message included in the packet; decoding the message; identifying, via the decoding of the message, a request for a layer one or layer two (L1 or L2) property of the network link; appending, to a L1 or L2 property portion of the packet, a value of the requested L1 or L2 property of the network link; appending to the packet, an address of the network device; associating the address and the value in the packet; identifying, based on the packet, a destination address of the packet; and forwarding the appended packet to the destination address in response to the destination address being different from a local address.

In Example 2, the subject matter of Example 1 optionally includes wherein processing the packet based on the destination address comprises: determining the destination address is equivalent to an address of the network device; decoding the packet to identify a source address; generating a second packet, the second packet including the L1 or L2 property portion, the address, and the association; and transmitting the second packet to the source address.

In Example 3, the subject matter of any one or more of Examples 1-2 optionally include property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

In Example 4, the subject matter of any one or more of Examples 1-3 optionally include wherein the decoding of the packet comprising second decoding a layer three or a layer four protocol header, and wherein the identifying of the message is based on the second decoding.

In Example 5, the subject matter of Example 4 optionally includes wherein the layer three protocol header or layer four protocol header is an Internet Control Message Protocol (ICMP) protocol header.

In Example 6, the subject matter of any one or more of Examples 4-5 optionally include wherein the layer three protocol header or layer four protocol header is a user datagram protocol (UDP) header.

In Example 7, the subject matter of any one or more of Examples 1-6 optionally include wherein the packet is received from a source device and a destination device is identified by the destination address, wherein the network device is included in a network path between the source device and the destination device.

Example 8 is a system, comprising: hardware processing circuitry; and one or more hardware memories storing instructions that when executed configure the hardware processing circuitry to perform operations comprising: receiving, at a network device and via a network link, a packet; decoding the packet; identifying, based on the decoding, a message included in the packet; decoding the message; identifying, via the decoding of the message, a request for a layer one or layer two (L1 or L2) property of the network link; appending, to a L1 or L2 property portion of the packet, a value of the requested L1 or L2 property of the network link; appending to the packet, an address of the network device; associating the address and the value in the packet; identifying, based on the packet, a destination address of the packet; and forwarding the appended packet to the destination address in response to the destination address being different from a local address.

In Example 9, the subject matter of Example 8 optionally includes wherein the processing of the packet based on the destination address comprises: determining the destination address is equivalent to an address of the network device; decoding the packet to identify a source address; generating a second packet, the second packet including the L1 or L2 property portion, the address, and the association; and transmitting the second packet to the source address.

In Example 10, the subject matter of any one or more of Examples 8-9 optionally include property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

In Example 11, the subject matter of any one or more of Examples 8-10 optionally include wherein the decoding of the packet comprising second decoding a layer three or a layer four protocol header, and wherein the identifying of the message is based on the second decoding.

In Example 12, the subject matter of Example 11 optionally includes wherein the layer three protocol header or layer four protocol header is an Internet Control Message Protocol (ICMP) protocol header.

In Example 13, the subject matter of any one or more of Examples 11-12 optionally include wherein the layer three protocol header or layer four protocol header is a user datagram protocol (UDP) header.

In Example 14, the subject matter of any one or more of Examples 8-13 optionally include wherein the packet is received from a source device and a destination device is identified by the destination address, wherein the network device is included in a network path between the source device and the destination device.

Example 15 is a non-transitory computer readable storage medium comprising instructions that when executed configure hardware processing circuitry to perform operations comprising: receiving, at a network device and via a network link, a packet; decoding the packet; identifying, based on the decoding, a message included in the packet; decoding the message; identifying, via the decoding of the message, a request for a layer one or layer two (L1 or L2) property of the network link; appending, to a L1 or L2 property portion of the packet, a value of the requested L1 or L2 property of the network link; appending to the packet, an address of the network device; associating the address and the value in the packet; identifying, based on the packet, a destination address of the packet; and forwarding the appended packet to the destination address in response to the destination address being different from a local address.

In Example 16, the subject matter of Example 15 optionally includes wherein the processing of the packet based on the destination address comprises: determining the destination address is equivalent to an address of the network device; decoding the packet to identify a source address; generating a second packet, the second packet including the L1 or L2 property portion, the address, and the association; and transmitting the second packet to the source address.

In Example 17, the subject matter of any one or more of Examples 15-16 optionally include property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

In Example 18, the subject matter of any one or more of Examples 15-17 optionally include wherein the decoding of the packet comprising second decoding a layer three or a layer four protocol header, and wherein the identifying of the message is based on the second decoding.

In Example 19, the subject matter of Example 18 optionally includes wherein the layer three protocol header or layer four protocol header is an Internet Control Message Protocol (ICMP) protocol header or a user datagram protocol (UDP) header.

In Example 20, the subject matter of any one or more of Examples 15-19 optionally include wherein the packet is received from a source device and a destination device is identified by the destination address, wherein the network device is included in a network path between the source device and the destination device.

The invention claimed is:

1. A method performed by a network device, the method comprising:
 receiving, at the network device and via a network link, a packet;
 decoding the packet;
 identifying, based on the decoding, a message included in the packet;
 decoding the message;

identifying, via the decoding of the message, a request for a layer one or layer two (L1 or L2) property of the network link;

appending, to a L1 or L2 property portion of the packet, a value of the requested L1 or L2 property of the network link;

appending to the packet, an address of the network device;

associating the address and the value in the packet;

identifying, based on the packet, a destination address of the packet; and forwarding the appended packet to the destination address in response to the destination address being different from a local address of the network device.

2. The method of claim 1, wherein processing the packet based on the destination address comprises:

determining the destination address is equivalent to an address of the network device;

decoding the packet to identify a source address;

generating a second packet, the second packet including the L1 or L2 property portion, the address, and the association; and transmitting the second packet to the source address.

3. The method of claim 1, wherein the request for the L1 or L2 property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

4. The method of claim 1, wherein the decoding of the packet comprising second decoding a layer three protocol header or a layer four protocol header, and wherein the identifying of the message is based on the second decoding.

5. The method of claim 4, wherein the layer three protocol header or layer four protocol header is an Internet Control Message Protocol (ICMP) protocol header.

6. The method of claim 4, wherein the layer three protocol header or layer four protocol header is a user datagram protocol (UDP) header.

7. The method of claim 1, wherein the packet is received from a source device and a destination device is identified by the destination address, wherein the network device is included in a network path between the source device and the destination device.

8. A system, comprising:

hardware processing circuitry; and one or more hardware memories storing instructions that when executed configure the hardware processing circuitry to perform operations comprising:

receiving, at a network device and via a network link, a packet;

decoding the packet;

identifying, based on the decoding, a message included in the packet;

decoding the message;

identifying, via the decoding of the message, a request for a layer one or layer two (L1 or L2) property of the network link;

appending, to a L1 or L2 property portion of the packet, a value of the requested L1 or L2 property of the network link;

appending to the packet, an address of the network device;

associating the address and the value in the packet;

identifying, based on the packet, a destination address of the packet; and forwarding the appended packet to the destination address in response to the destination address being different from a local address of the network device.

9. The system of claim 8, wherein the processing of the packet based on the destination address comprises:

determining the destination address is equivalent to an address of the network device;

decoding the packet to identify a source address;

generating a second packet, the second packet including the L1 or L2 property portion, the address, and the association; and transmitting the second packet to the source address.

10. The system of claim 8, wherein the request for the L1 or L2 property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

11. The system of claim 8, wherein the decoding of the packet comprising second decoding a layer three protocol header or a layer four protocol header, and wherein the identifying of the message is based on the second decoding.

12. The system of claim 11, wherein the layer three protocol header or layer four protocol header is an Internet Control Message Protocol (ICMP) protocol header.

13. The system of claim 11, wherein the layer three protocol header or layer four protocol header is a user datagram protocol (UDP) header.

14. The system of claim 8, wherein the packet is received from a source device and a destination device is identified by the destination address, wherein the network device is included in a network path between the source device and the destination device.

15. A non-transitory computer readable storage medium comprising instructions that when executed configure hardware processing circuitry to perform operations comprising:

receiving, at a network device and via a network link, a packet;

decoding the packet;

identifying, based on the decoding, a message included in the packet;

decoding the message;

identifying, via the decoding of the message, a request for a layer one or layer two (L1 or L2) property of the network link;

appending, to a L1 or L2 property portion of the packet, a value of the requested L1 or L2 property of the network link;

appending to the packet, an address of the network device;

associating the address and the value in the packet;

identifying, based on the packet, a destination address of the packet; and forwarding the appended packet to the destination address in response to the destination address being different from a local address of the network device.

16. The non-transitory computer readable storage medium of claim 15, wherein the processing of the packet based on the destination address comprises:

determining the destination address is equivalent to an address of the network device;

decoding the packet to identify a source address;

generating a second packet, the second packet including the L1 or L2 property portion, the address, and the association; and transmitting the second packet to the source address.

17. The non-transitory computer readable storage medium of claim 15, wherein the request for the L1 or L2 property of the network link indicates a request for a media access control security enabled (MACSec) property, a synchronous Ethernet enabled property, a precision time protocol enabled property a synchronization state of the network device, an optical transport network (OTN) security enabled property, a property indicating a maximum transmission data unit (MTU) size, or an attribute of the network device.

18. The non-transitory computer readable storage medium of claim 15, wherein the decoding of the packet comprising second decoding a layer three protocol header or a layer four protocol header, and wherein the identifying of the message is based on the second decoding.

19. The non-transitory computer readable storage medium of claim 18, wherein the layer three protocol header or layer four protocol header is an Internet Control Message Protocol (ICMP) protocol header or a user datagram protocol (UDP) header.

20. The non-transitory computer readable storage medium of claim 15, wherein the packet is received from a source device and a destination device is identified by the destination address, wherein the network device is included in a network path between the source device and the destination device.

* * * * *